United States Patent
Yang et al.

(10) Patent No.: US 7,305,688 B2
(45) Date of Patent: Dec. 4, 2007

(54) TILTING MOVEMENT OPTICAL PICKUP ACTUATOR AND OPTICAL RECORDING AND/OR REPRODUCING APPARATUS USING THE SAME AND METHOD

(75) Inventors: Yoon-tak Yang, Suwon-si (KR); Byung-youn Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 10/781,656

(22) Filed: Feb. 20, 2004

(65) Prior Publication Data

US 2004/0168178 A1    Aug. 26, 2004

(30) Foreign Application Priority Data

Feb. 21, 2003    (KR)    ............... 10-2003-0010977

(51) Int. Cl.
G11B 7/09    (2006.01)
G11B 7/095    (2006.01)

(52) U.S. Cl. .................. 720/683; 369/44.22
(58) Field of Classification Search ............ 369/244.1, 369/44.22, 44.15, 44.16, 53.19; 720/681, 720/682, 683; 359/814, 823, 824
See application file for complete search history.

(56) References Cited

U.S. PATENT DOCUMENTS

| | | | | |
|---|---|---|---|---|
| 5,430,699 | A * | 7/1995 | Matsubara et al. | 369/44.32 |
| 2002/0006090 | A1 * | 1/2002 | Kawano | 369/44.32 |
| 2002/0071358 | A1 * | 6/2002 | Kim et al. | 369/44.16 |
| 2003/0021218 | A1 * | 1/2003 | Song et al. | 369/244 |
| 2003/0072244 | A1 * | 4/2003 | Matsui | 369/112.23 |
| 2003/0156529 | A1 * | 8/2003 | Tajiri | 369/244 |
| 2004/0268373 | A1 * | 12/2004 | Song et al. | 720/683 |

FOREIGN PATENT DOCUMENTS

| | | | |
|---|---|---|---|
| EP | 0 997 889 A1 | | 5/2000 |
| EP | 1 124 224 A2 | | 8/2001 |
| JP | 04301234 A | * | 10/1992 |
| JP | 08180441 A | * | 7/1996 |
| JP | 10116431 A | * | 5/1998 |
| JP | 2000-293874 | | 10/2000 |
| JP | 2001319350 A | * | 11/2001 |
| JP | 2002140828 A | * | 5/2002 |
| JP | 2002-197698 | | 7/2002 |
| KR | 1999-0085268 | | 12/1999 |

OTHER PUBLICATIONS

Notice of Office Action issued by the Korean Patent Office on Jan. 26, 2005 with English translation.

* cited by examiner

Primary Examiner—William J Klimowicz
(74) Attorney, Agent, or Firm—Staas & Halsey LLP

(57) ABSTRACT

The optical pickup actuator includes a bobbin in which an objective lens is mounted, and suspension wires each having one end fixed on a side of the bobbin and the other end fixed to a holder disposed on a portion of a base to allow the bobbin to move with respect to the base. A magnetic circuit is installed in the bobbin and the base including a pair of unipolar magnets positioned on the base to face two sides of the bobbin. A focusing coil is wound around the bobbin. A plurality of tilting coils are installed on an upper portion of the bobbin and/or on a lower portion of the bobbin interact with the unipolar magnets to generate an electromagnetic force to control a tilting movement when a central axis of the objective lens is disposed in an upward and a downward direction.

10 Claims, 9 Drawing Sheets

TILTING MOVEMENT OPTICAL PICKUP ACTUATOR AND OPTICAL RECORDING AND/OR REPRODUCING APPARATUS USING THE SAME AND METHOD

CROSS-REFERENCE TO RELATED APPLICATIONS

This application claims the benefit of Korean Patent Application No. 2003-10977, filed on Feb. 21, 2003, in the Korean Intellectual Property Office, the disclosure of which is hereby incorporated by reference.

BACKGROUND OF THE INVENTION

1. Field of the Invention

The present invention relates to an optical pickup actuator and an optical recording and/or reproducing apparatus using the optical pickup actuator, and more particularly, to a tilting movement optical pickup actuator which can be manufactured at a low cost by having a reduced number of magnets, and an optical recording and/or reproducing apparatus using the tilting movement optical pickup actuator.

2. Description of the Related Art

In general, optical pickups are installed in optical recording and/or reproducing apparatuses to record information on and/or reproduce information from a recording medium, such as an optical disc, and move in a radial direction of the optical disc without contacting the optical disc.

Such optical pickups require an actuator, which moves an objective lens in a tracking direction, a focusing direction, and/or a tilting direction to form a laser beam emitted from a light source on a correct portion of the optical disc. A tracking direction movement adjusts the objective lens in a radial direction of the optical disc to form the light spot in the center of a track.

Such an optical pickup actuator carries out tracking and focusing movements, i.e., biaxial movements. In recent years, to facilitate the use of high recording density media, a numerical aperture (NA) of the objective lens has been increased and a wavelength of the light source has been shortened, and consequently a tilting margin of the optical pickup actuator has been decreased. To use high recording density media, the optical pickup actuator requires triaxial movements. A tilting movement, particularly, a radial tilting movement, is required in addition to the existing biaxial movements. Thus, a triaxial movement optical pickup actuator, which is able to perform a tilting movement as well as the existing biaxial movements, is required. The triaxial movement optical pickup actuator is referred to as a tilting movement optical pickup actuator.

The tilting movement optical pickup actuator generally has a structure incorporating a four-sided magnetic circuit. The four-sided magnetic circuit has driving coils and magnets disposed on four sides of a bobbin.

FIG. 1 is a schematic view of an example of a conventional tilting movement optical pickup actuator. Referring to FIG. 1, the conventional tilting movement optical pickup actuator includes a bobbin 2 in which an objective lens is mounted, and a plurality of wires 6a, 6b. One end of each of the wires is fixed on a side of the bobbin 2 and the other end is coupled to a holder 3 disposed on a portion of a base (not shown). This allows the bobbin 2 and a movable portion (not shown) to move with respect to the base in a focusing direction and a tracking direction. A four-sided magnetic circuit moves the moving unit.

Four of the wires 6a serve as suspensions to support the movable portion with respect to the base. Only two of the four suspension wires 6a are shown in FIG. 1. Reference numeral 6b denotes wires used as paths through which a current is applied for a tilting movement.

The four-sided magnetic circuit includes a pair of focusing coils 4a and 4b, positioned on opposite ends of the bobbin 2 in a radial direction of an optical disc, and a pair of tracking coils 4c and 4d installed on opposite sides of the bobbin 2 in a tangential direction of the optical disc. Magnets 5a through 5d interact with currents flowing through the focusing coils 4a and 4b and the tracking coils 4c and 4d to produce electromagnetic forces to drive the movable unit. Yokes 8 are also included.

In the conventional tilting movement optical pickup actuator, upon application of a current to the focusing coils 4a and 4b and the tracking coils 4c and 4d, the current flowing through the focusing coils 4a and 4b and the tracking coils 4c and 4d interacts with a magnetic flux from the magnets 5a through 5d to generate an electromagnetic force that acts in the focusing coils 4a and 4b and the tracking coils 4c and 4d. Thus, the movable portion moves in the focusing direction and the tracking direction. As a result, an objective lens 1 mounted in the bobbin 2 moves in the focusing direction and the tracking direction.

When currents are applied to the respective focusing coils 4a and 4b in opposite directions, electromagnetic forces act in the focusing coils 4a and 4b in opposite directions, and the moving unit moves in a radial tilting direction. As a result, the objective lens 1 mounted in the bobbin 2 moves in the radial tilting direction.

Since the electromagnetic forces act in directions that are parallel to a central axis of the objective lens 1, the magnets 5a and 5b and the focusing coils 4a and 4b are used for focusing and tilting movements. In other words, when currents of equal magnitude and direction are applied to the focusing coils 4a and 4b, a focusing movement with a predetermined displacement is performed. When currents equal in magnitude but opposite in direction are applied to the focusing coils 4a and 4b, a tilting movement is performed.

However, the conventional tilting-movement optical pickup actuator includes a four-sided magnetic circuit having four pre-wound coils 4a through 4d installed on four sides of the bobbin 2, and four magnets 5a through 5d. Thus, the conventional, required use of four coils 4a through 4d and four magnets 5a through 5d increases the number of components and production costs, and results in poor productivity.

The use of pre-wound coils, requires a process of winding the coils and a process of attaching the wound coils to a bobbin. Thus, the number of manufacturing operations is increased. In addition, pre-wound coils are lower in quality than directly wound coils. Further, four magnets are required.

In addition, in the conventional tilting movement optical pickup actuator, magnets face four sides of the bobbin 2, and focusing and tracking coils are positioned on each of the four sides of the bobbin 2 to face the magnets. As a result, wiring between the focusing and tracking coils is complicated.

SUMMARY OF THE INVENTION

Accordingly, it is an aspect of the present invention to provide a tilting movement optical pickup actuator that includes an inexpensive magnetic circuit and performs a tilting movement in addition to focusing and tracking movements using only two unipolar magnets, and an optical recording and/or reproducing apparatus using the tilting movement optical pickup actuator.

According to an aspect of the present invention, an optical pickup actuator includes a bobbin in which an objective lens is mounted, and a suspension having one end fixed on sides of the bobbin and another end fixed to a holder disposed on a portion of a base to allow the bobbin to be movable with respect to the base. A magnetic circuit is positioned in the bobbin and the base, and includes a pair of unipolar magnets positioned on the base to face two sides of the bobbin. A focusing coil is wound around the bobbin, and a pair of tracking coils are wound opposite to one another and next to the objective lens in the radial direction to cross over the focusing coil. The tracking coils enclose the bobbin and interact with the unipolar magnets to generate an electromagnetic force for controlling a tracking movement. A plurality of tilting coils are installed on an upper portion of the bobbin and/or on a lower portion of the bobbin and interact with the unipolar magnets to generate an electromagnetic force to control a tilting movement when a central axis of the objective lens is disposed in an upward and downward direction. An upward direction is that closer to an optical recording medium and a downward direction opposite the upward direction.

According to an aspect of the invention, reels are formed on the bobbin so that the tracking coils and/or the tiling coils are directly wound around the reels.

According to an aspect of the invention, a first pair of reels are formed opposite one another and next to the objective lens in the radial direction on the upper portion of the bobbin to wind the tracking coils and the tilting coils, and the tilting coils are wound around the first pair of reels on the upper portion of the bobbin.

According to an aspect of the invention, a second pair of reels are formed opposite one another and next to the objective lens in the radial direction on the lower portion of the bobbin to wind the tracking coils and the tilting coils, and the tilting coils are wound around the second pair of reels on the lower portion of the bobbin.

According to an aspect of the present invention, a mount is spaced apart from the reels on the upper and/or lower portions of the bobbin to hold the objective lens so as to reduce an effect of heat from the coils on the objective lens. The tracking coils and the focusing coil are positioned on the bobbin so that effective coil portions of the tracking coils are positioned closer to the unipolar magnets than an effective coil portion of the focusing coil or the effective coil portion of the focusing coil are positioned closer to the unipolar magnets than the effective coil portions of the tracking coils. At least one hole is formed in the bobbin to reduce a transmission of heat generated from the focusing coil, the tracking coils, and/or the tilting coils to the objective lens.

According to another aspect of the present invention, an optical recording and/or reproducing apparatus includes an optical pickup including an actuator to actuate an objective lens and movable in a radial direction of an optical disc to record information on and/or reproduce information from the optical disc. The apparatus includes a controller to control focusing and tracking servo operations of the optical pickup and a bobbin to which an objective lens is mounted. A suspension having one end fixed on a side of the bobbin and the other end fixed to a holder disposed on a portion of a base allows the bobbin to be movable with respect to the base. A magnetic circuit includes a pair of unipolar magnets installed on the base each facing an opposite side of the bobbin. A focusing coil is wound around the bobbin, and a pair of tracking coils are wound opposite one another and next to the objective lens in the radial direction so as to cross over the focusing coil, enclose the bobbin, and interact with the unipolar magnets to generate an electromagnetic force to control a tracking movement. A plurality of tilting coils are installed on an upper portion of the bobbin and/or on a lower portion of the bobbin and interact with the unipolar magnets to generate an electromagnetic force to control a tilting movement when a central axis of the objective lens is disposed in an upward and a downward direction. An upward direction is the direction closer to an optical recording medium and the downward direction opposite the upward direction.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become apparent from the following description of the embodiments, taken in conjunction with the accompanying drawings in which.

DETAILED DESCRIPTION OF THE INVENTION

Figure 1:
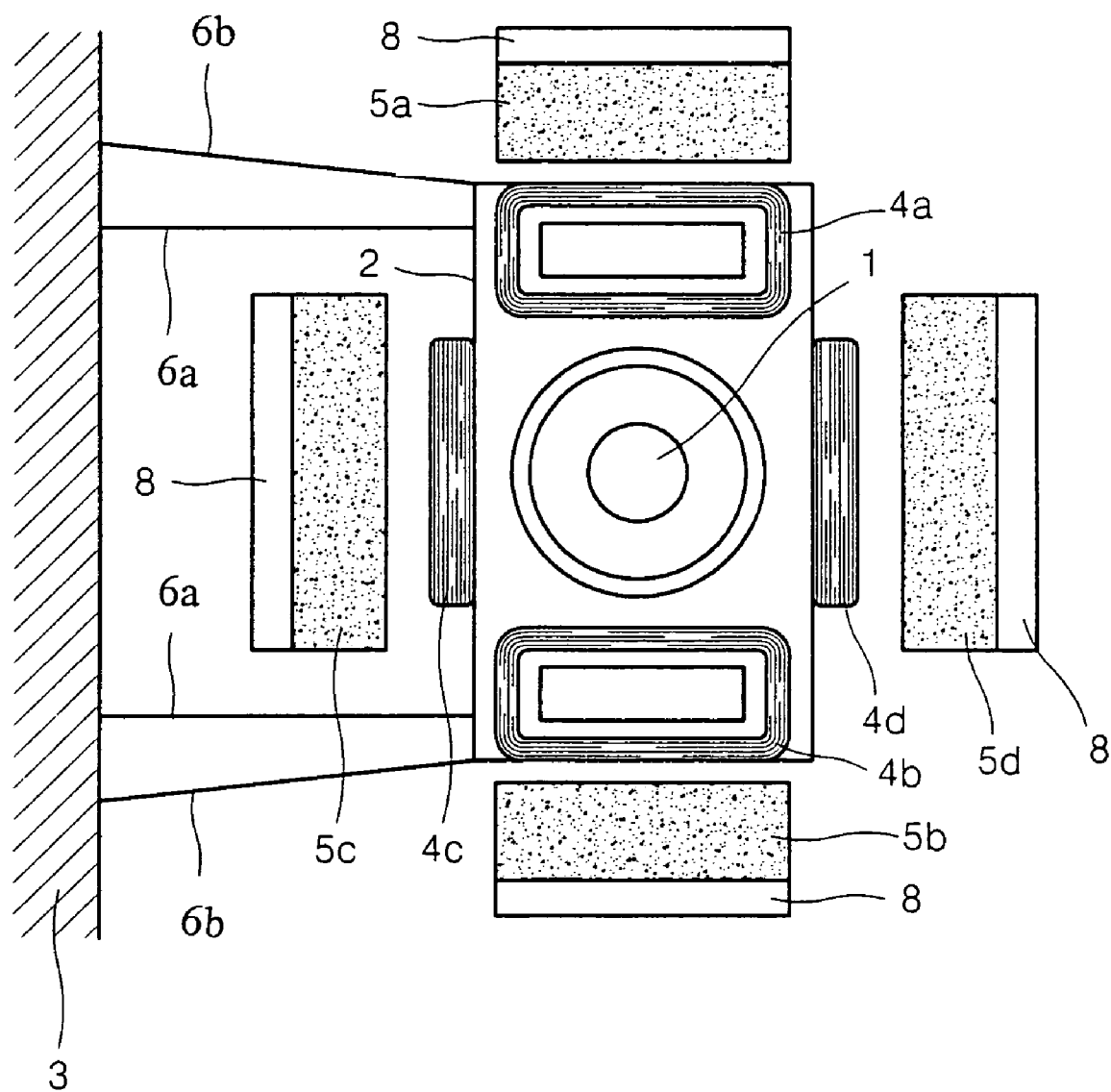
FIG. 1 is a schematic plan view of an example of a conventional tilting movement optical pickup actuator.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
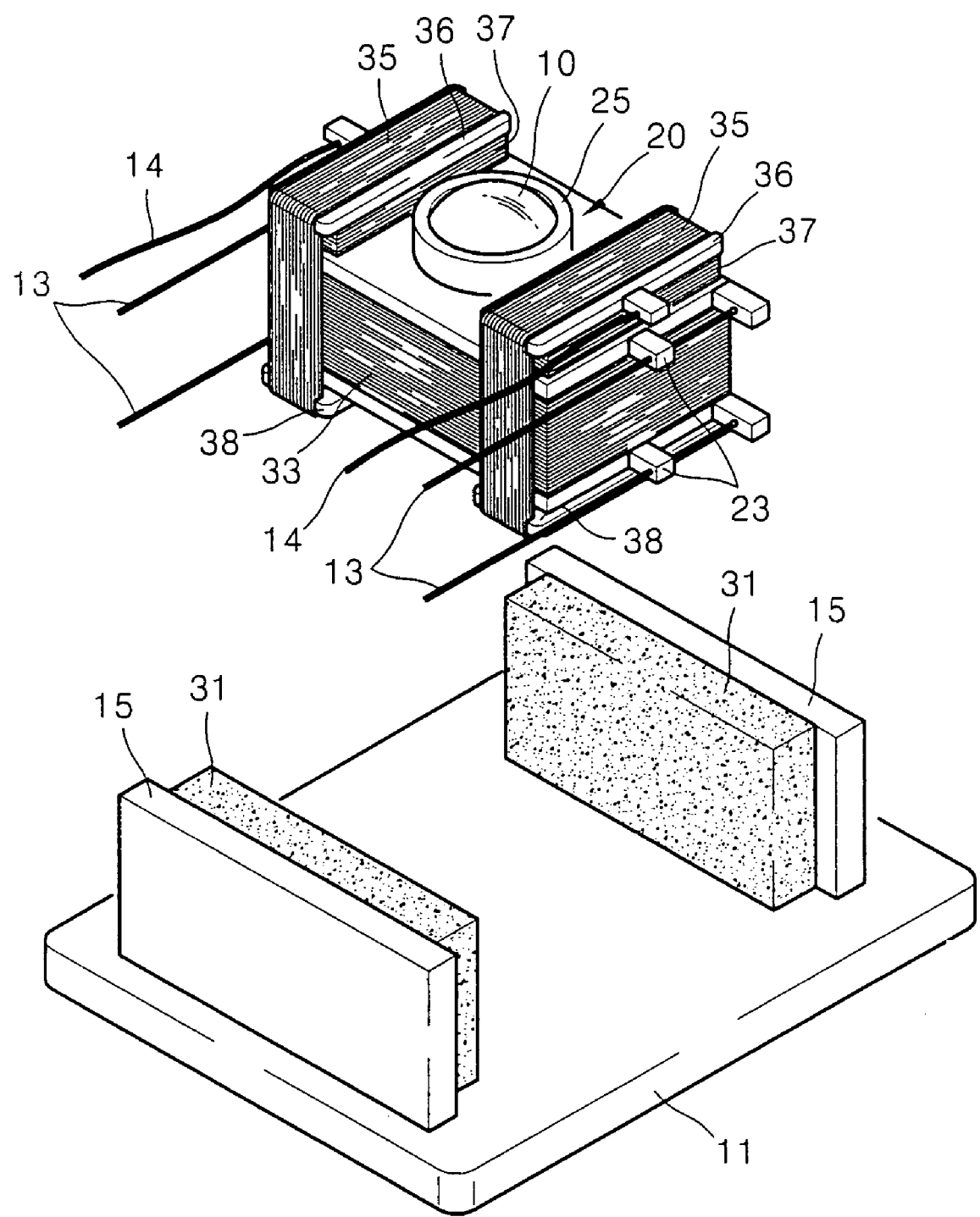
FIG. 2 is a schematic perspective view of a tilting movement optical pickup actuator, according to an aspect of the present invention.
Figure 3:
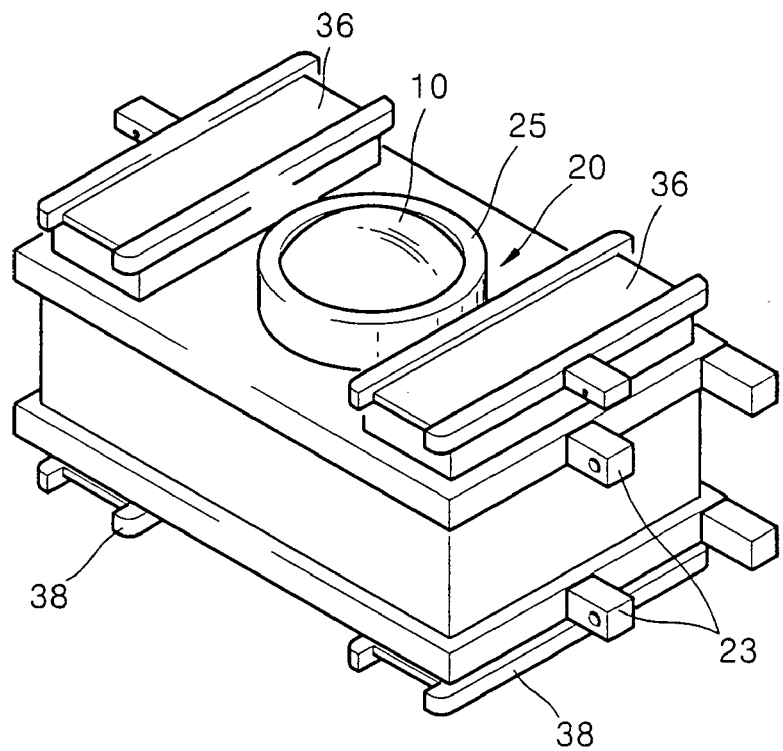
FIG. 3 is a perspective view of a bobbin of FIG. 2.
Figure 4:
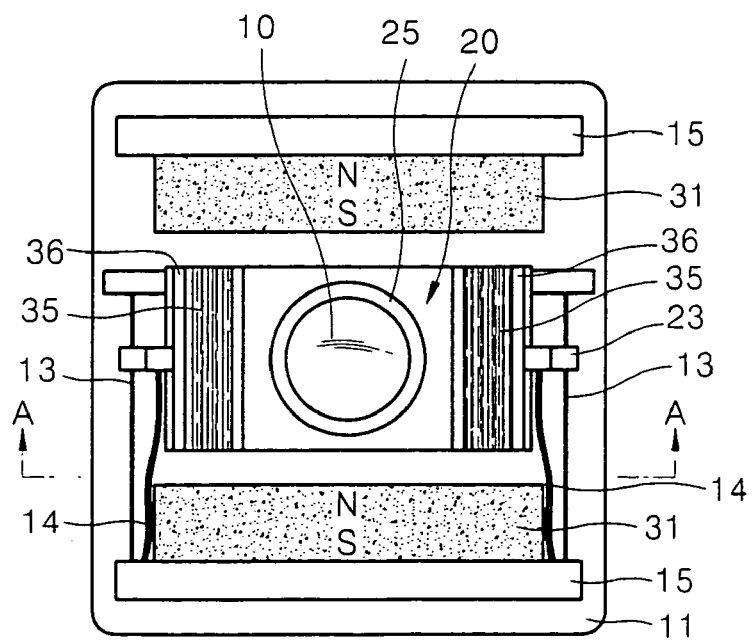
FIG. 4 is a plan view of the tilting movement optical pickup actuator of FIG. 2.
Figure 5:
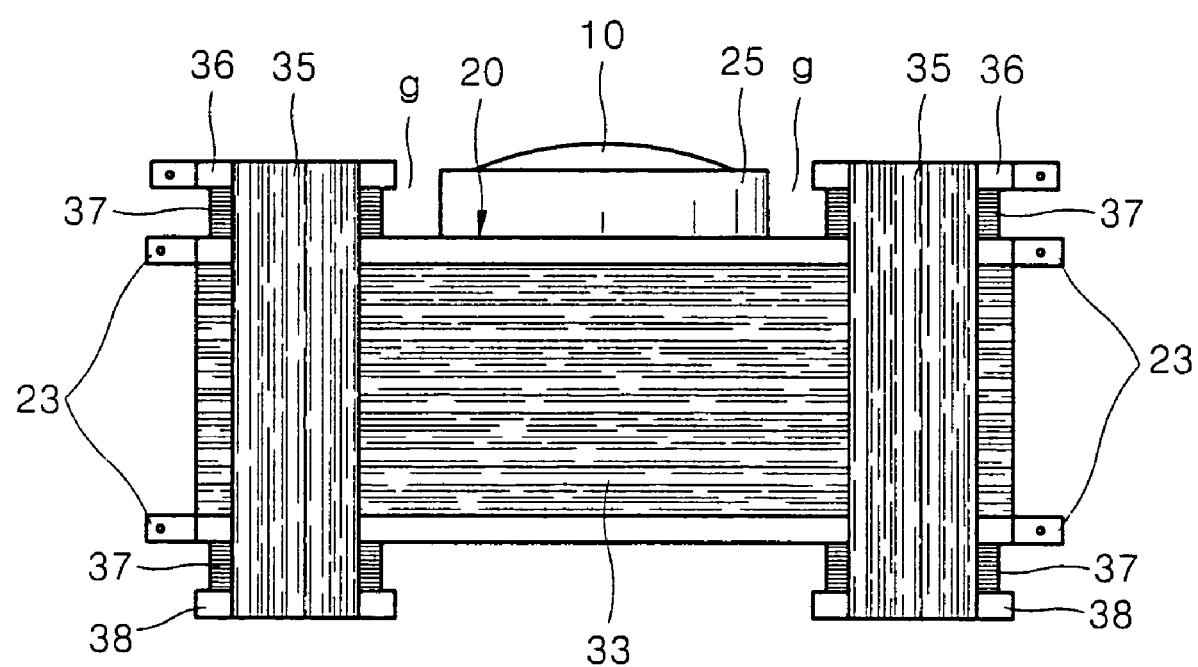
FIG. 5 is a cross-sectional view of line A-A of FIG. 4.

FIG. 2 is a schematic perspective view of a tilting movement optical pickup actuator, according to an aspect of the present invention, FIG. 3 is a perspective view of a bobbin shown in FIG. 2, FIG. 4 is a plan view of the tilting movement optical pickup actuator of FIG. 2, and FIG. 5 is a cross-sectional view of line A-A of FIG. 4.

Referring to FIGS. 2 through 5, the tilting movement optical pickup actuator includes a bobbin 20 in which an objective lens 10 is mounted. Suspension wires 13 each having one end fixed on a side of the bobbin 20 and another end coupled to a holder (not shown) are disposed on a portion of the base 11 and movingly support the bobbin 20 above the base 11. A magnetic circuit is positioned in the bobbin 20 and the base 11.

The magnetic circuit includes a pair of unipolar magnets 31 positioned on the base 11 so as to face opposing sides of the bobbin 20 parallel to a radial direction. A focusing coil 33 is wound around the bobbin 20, and a pair of tracking coils 35 are wound around the bobbin 20 on opposite ends thereof positioned next to the objective lens 10 in the radial direction. A plurality of tilting coils 37 are wound on an upper portion of the bobbin 20 and on a lower portion of the bobbin 20. The pair of unipolar magnets 31 are positioned on the base 11 to face opposing sides of the bobbin 20 in a tangential direction of an optical recording medium, i.e., an optical disc.

The suspension wires 13 are four wires used to apply currents for tracking and focusing control. The tilting movement optical pickup actuator according to an aspect of the present invention further includes two wires 14 to apply a current for a tilting movement.

The tilting movement optical pickup actuator according to an aspect of the present invention has reels are formed on the bobbin 20 so at least a portion of the coils are directly wound around the bobbin 20 around the reels. The actuator also includes pair of unipolar magnets 31.

As shown in FIGS. 2 through 5, first reels 36 and second reels 38 are formed on a bobbin 20 to directly wind the tracking coils 35 and the tilting coils 37, respectively. The body of the bobbin is a third reel to directly wind the focusing coil 33.

The focusing coil 33 is wound around the bobbin 20 to interact with the pair of unipolar magnets 31 so as to generate an electromagnetic force to move a movable portion of the tilting movement optical pickup actuator in a focusing direction.

The body of the bobbin 20 has a first reel structure to directly wind the focusing coil 33. Alternatively, instead of forming the body of the bobbin 20 in the reel structure, a winding position of the focusing coil 33 is restricted by protrusions 23 in which the suspensions 13 are installed.

When the central axis of the objective lens 10 is disposed in upward and downward directions, i.e., a focusing direction, the focusing coil 33 is influenced by an upward or downward electromagnetic force produced from a magnetic field formed by the unipolar magnets 31 along the direction of a current flowing through the focusing coil 33. The direction of a magnetic flux produced from the unipolar magnets 31 is according to the Fleming's left-hand rule. As a result, the entire movable portion of the tilting movement optical pickup actuator moves in the focusing direction.

According to an aspect of the present invention, first reels 36 and second reels 38 are formed on the bobbin 20 to wind the tracking coils 35 and the tilting coils 37.

According to an aspect of the present invention, the first reels 36 and the second reels 38 are formed on both upper and lower portions of the bobbin 20. In other words, a pair of first reels 36 are formed on the upper portion of the bobbin 20 positioned opposite one another and next to the objective lens 10 in the radial direction. A pair of second reels 38 are formed on the lower portion of the bobbin 20 positioned opposing sides of the objective lens 10 in the radial direction.

According to an aspect of the present invention, as shown in FIGS. 2 through 5, the pair of tracking coils 35 are wound around the reels 36 and 38 disposed opposite one another and next to the objective lens 10 in the radial direction to cross over the focusing coil 33 around the bobbin 20. Four tilting coils 37 are wound around the reels 36 and 38 disposed opposite to one another and next to the objective lens 10 in the radial direction on the upper and lower portions of the bobbin 20, and substantially parallel with the focusing coil 33.

The pair of tracking coils 35 are wound around both the reels 36 and 38 opposing one another and next to the objective lens 10 in the radial direction on the upper and lower portions of the bobbin 20 to cross over the focusing coil 33. The tracking coils are directly wound around the bobbin 20 so as to interact with the unipolar magnets 31 to produce an electromagnetic force for a tracking movement.

Effective portions of a pair of tracking coils 35 are those portions positioned on both sides of the bobbin 20 facing the unipolar magnets 31 so that a current flows upward and downward, i.e., in a focusing direction.

When the pair of tracking coils 35 are wound around both the reels 36 and 38 disposed opposite one another and next to the objective lens 10 in the radial direction to encircle the bobbin 20, effective tracking coil portions are symmetrically disposed on two sides of the bobbin 20 facing the unipolar magnets 31. A current flows in an upward and a downward direction. Thus, the entire movable portion of the tilting movement optical pickup actuator stably moves in a tracking direction.

By forming pairs of reels 36 and 38 on the upper and lower portions of the bobbin 20, respectively, one pair of tilting coils 37 is directly wound around a pair of first reels 36 disposed opposite one another and next to the objective lens 10 in the radial direction on the upper portion of the bobbin 20 so as to be substantially parallel with the focusing coil 33. Another pair of tilting coils 37 is directly wound around a pair of second reels 38 disposed opposite one another and next to the objective lens 10 in the radial direction on the lower portion of the bobbin 20 so as to be substantially parallel with the focusing coil 33.

Effective portions of the two pairs of tilting coils 37 face the unipolar magnets 31.

According to an aspect of the present invention, a pair of tilting coils 37 are positioned above the upper portion of the bobbin 20 or below the lower portion of the bobbin 20 and wound in opposite directions. Although a current of the same magnitude is applied to the pair of tilting coils 37, currents flow in opposite directions in a pair of tilting coils 37 positioned above the upper potion of the bobbin 20 and below the lower portion of the bobbin 20. Therefore, considering the directions of the currents flowing in the tilting coils 37 and the directions of magnetic fluxes produced from the unipolar magnets 31, electromagnetic forces are produced in opposite directions, i.e., in an upward and in a downward, according to Fleming's left-hand rule. As a result, the movable portion moves in a radial tilting direction.

Accordingly, when the tilting coils 37 are wound around the reels 36 and 38, the pair of unipolar magnets 31, disposed beside the objective lens 10 in a tangential direction, interact with the tilting coils 37 to stably move the entire movable portion of the tilting movement optical pickup actuator in the radial tilting direction.

The tilting coils 37 wound around the first reels 36 on the upper portion of the bobbin 20 produce a tilting movement force above the upper portion of the bobbin 20. Because the objective lens 10 is installed on the upper portion of the bobbin 20, the center of the radial tilting movement is closer to the objective lens 10. As a result, interference with a focus during the tilting movement is minimized. Also, the tilting coils 37 wound around the second reels 38 on the lower portion of the bobbin 20 contribute to increasing a radial tilting movement force. If the tilting coils 37 are positioned beside the objective lens 10 in the radial direction on both the upper and lower portions of the bobbin 20, the radial tilting movement force is greater than a case where the tilting coils 37 are positioned beside the objective lens 10 in the radial direction only on the upper portion of the bobbin 20.

As previously described, where the focusing coil 33, the tracking coils 35, and/or the tilting coils 37 are directly wound around the bobbin 20 on reels, the reels 36 and 38 serve as guides to inhibit coils from deformation resulting from excessive current.

According to an aspect of the present invention, the tilting movement optical pickup actuator is a triaxial movement optical pickup actuator including two unipolar magnets 31, the bobbin 20 on which coils may be wound, four tilting coils 37, one focusing coil 33, and two tracking coils 35.

As shown in FIGS. 2 through 5, when the tracking coils 35 are wound outside the focusing coil 33, effective coil portions of the tracking coils 35 are positioned closer to the unipolar magnets 31 than an effective coil portion of the focusing coil 33. As a result, sensitivity of the tracking movement is improved.

Alternatively, as shown in FIGS. 6 through 9, a focusing coil 133 is wound outside tracking coils 135 so that an effective coil portion of the focusing coil 133 is positioned closer to the unipolar magnets 31 than effective coil portions of the tracking coils 135.

Figure 6:
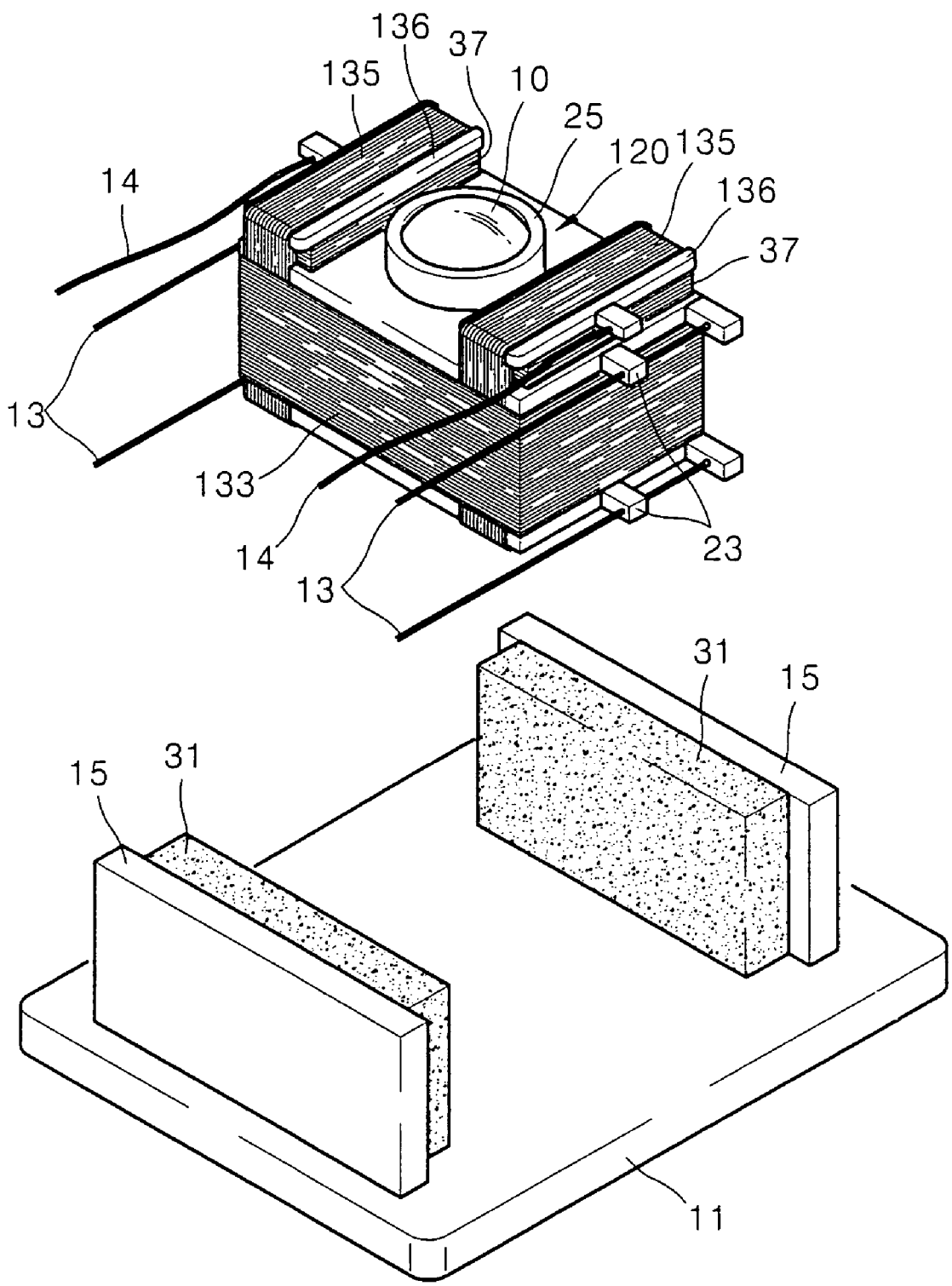
FIG. 6 is a schematic perspective view of a tilting movement optical pickup actuator, according to another aspect of the present invention.
Figure 7:
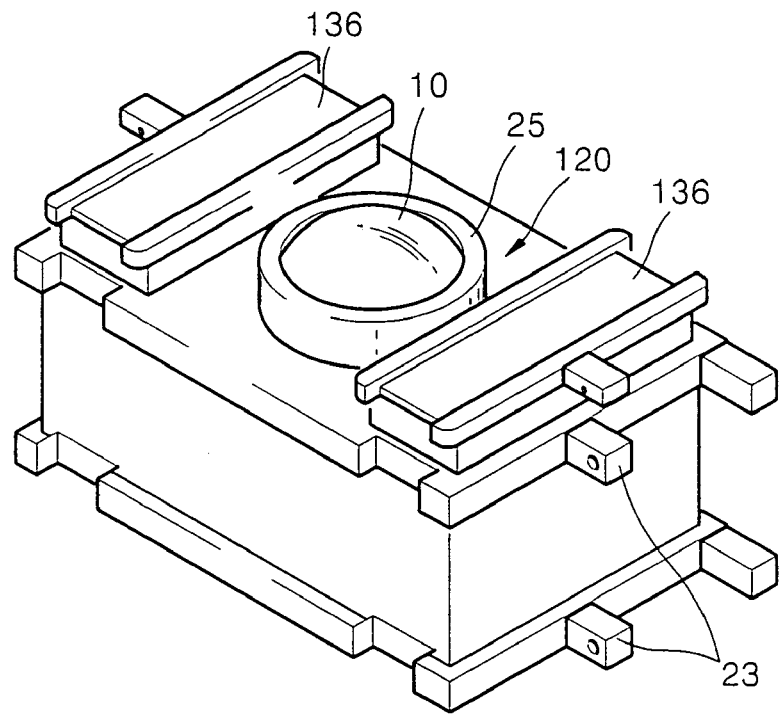
FIG. 7 is a perspective view of a bobbin of FIG. 6.
Figure 8:
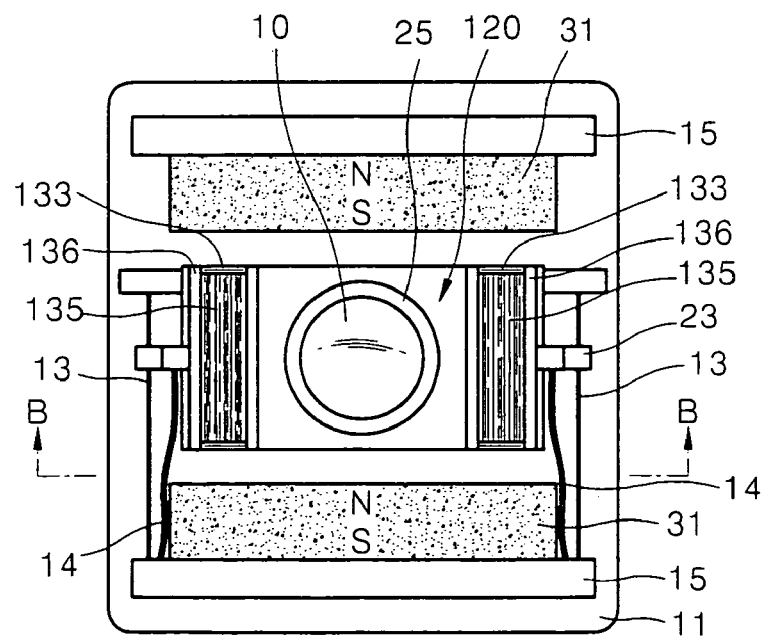
FIG. 8 is a plan view of the tilting movement optical pickup actuator of FIG. 6.
Figure 9:
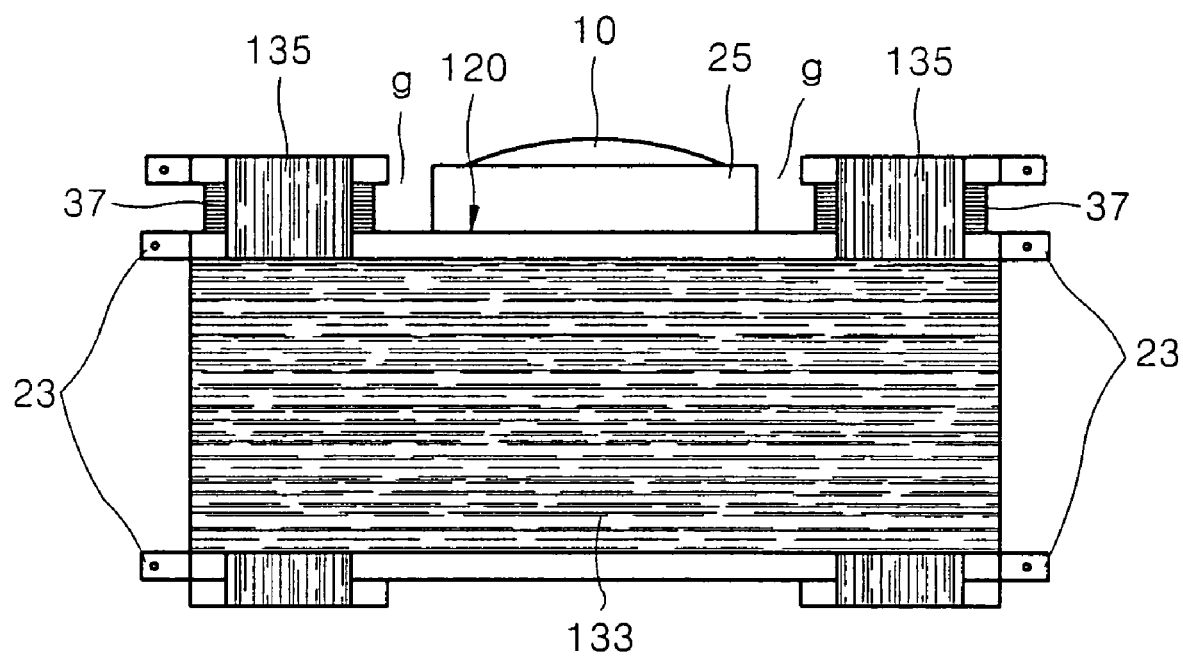
FIG. 9 is a cross-sectional view of line B-B of FIG. 8.

FIG. 6 is a schematic perspective view of a tilting movement optical pickup actuator, according to another aspect of the present invention, FIG. 7 is a perspective view of a bobbin of FIG. 6, FIG. 8 is a plan view of the tilting movement optical pickup actuator of FIG. 6, and FIG. 9 is a cross-sectional view of line B-B of FIG. 8.

Referring to FIGS. 6 and 9, the tilting movement optical pickup actuator has reel structures of a bobbin 120 formed so the focusing coil 133 is wound outside the tracking coils 135. First reels 136 are formed opposite one another and next to the objective lens 10 in the radial direction to directly wind the tracking coils 135 and tilting coils 37 above only an upper portion of the bobbin 120. The part of the bobbin 120 around which the focusing coil 133 is wound is increased.

In the case where the focusing coil 133 is wound outside the tracking coils 135, sensitivity of a focusing movement is improved, as opposed to the case when the focusing coil 33 is wound inside the tracking coils 35 as shown in FIGS. 2 through 5. Also, since the part of the bobbin 120 around which the focusing coil 133 is wound is increased, the sensitivity of the focusing movement is much higher.

The focusing coil 133, the tracking coils 135, the bobbin 120, and the reels 136 correspond to the focusing coil 33, the tracking coils 35, the bobbin 20, and the reels 36. The same reference numerals as those of FIGS. 2 through 5 denote similar elements as previously described, and thus will not be explained herein.

As shown in FIGS. 6 and 9, the tilting movement optical pickup actuator is a triaxial movement optical pickup actuator including two unipolar magnets 31, the bobbin 120 on which winding is possible, two tilting coils 37, one focusing coil 133, and two tracking coils 135.

While aspects according to the present invention have been explained with reference to FIGS. 2 through 5 and 6 through 9, the tilting movement optical pickup actuator may be further modified into various types of structures.

For example, the tilting movement optical pickup actuator according to the aspects of present invention shown in FIGS. 2 through 5 alternatively have the focusing coil 33 wound outside the tracking coils 35.

Also, the tilting movement optical pickup actuator according to aspects of the present invention shown in FIGS. 6 through 9 may alternatively include a pair of tilting coils 37 wound on a lower portion of the bobbin 120. The part of the bobbin 120 around which the focusing coil 133 is wound is reduced so that the tilting movement optical pickup actuator has a similar height as shown in FIGS. 6 through 9.

As shown in FIGS. 2 through 9, a mount 25 protrudes from the upper portion of the bobbin 20 and 120 to hold the objective lens 10. According to an aspect of the present invention, predetermined gaps g are formed between the mount 25 and the pair of reels 36 and 136 formed on the upper portion of the bobbin 20 and 120 and the tracking coils 35 and 135 and the tilting coils 37 wound around the reels 36 and 136. As described with reference to FIGS. 2 through 5, when the tilting coils 37 are installed on the lower portion of the bobbin 20, gaps g are alternatively formed between the mount 25 and the reels 38 on the lower portion of the bobbin 20.

As described above, when reels are spaced apart from the mount 25 so that tilting coils and tracking coils wound on the reels do not contact the mount 25, heat generated from currents applied to the tilting coils and/or the tracking coils on the objective lens 10 are reduced during tilting and tracking controls. As a result, the objective lens 10 is protected from an excessive current since spacing the mount 25 apart from the reels decreases transfer of heat.

Figure 10:
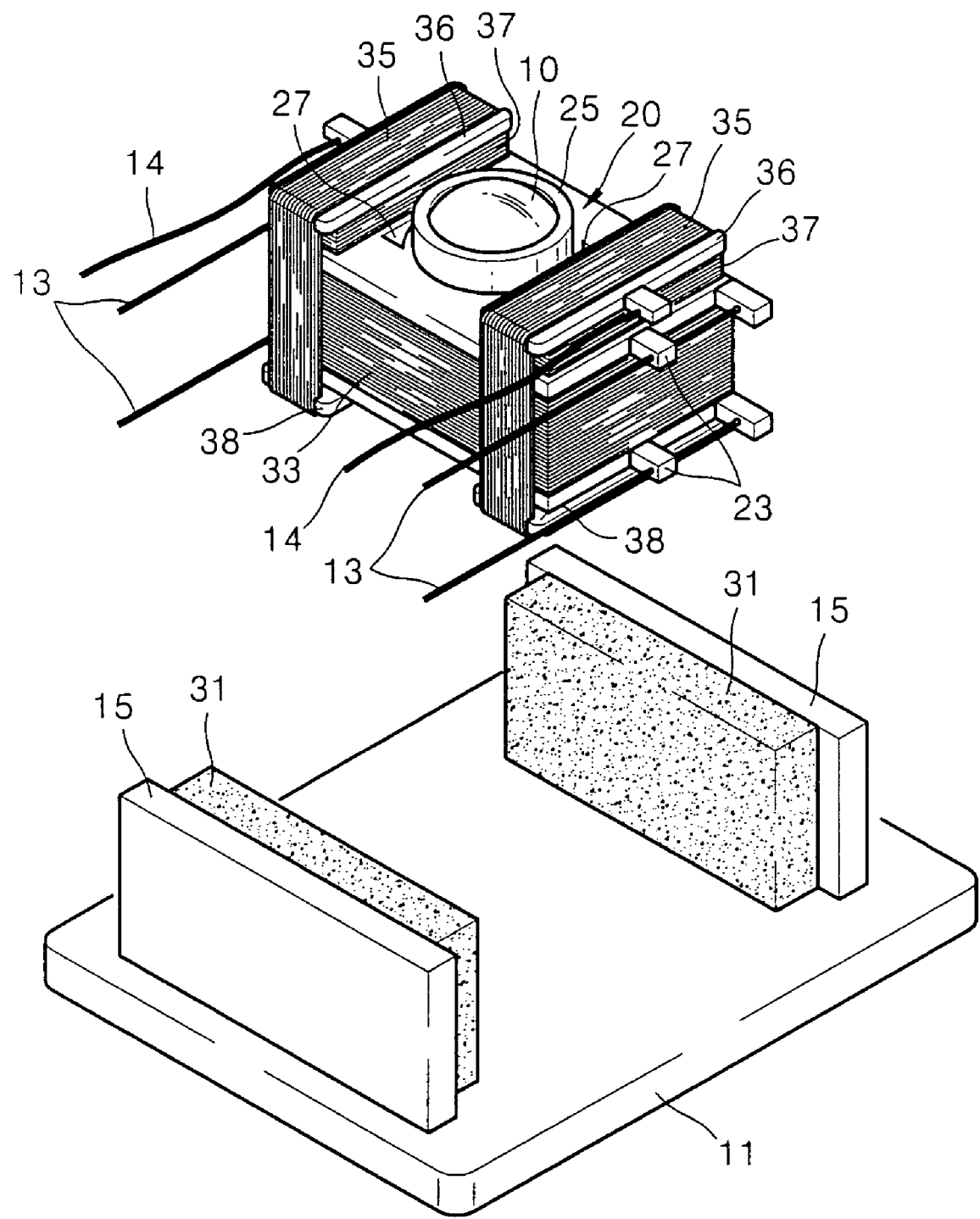
FIG. 10 is a schematic perspective view of a tilting movement optical pickup actuator, according to still another aspect of the present invention.

As shown in FIG. 10, at least one hole 27 to decrease a transfer of heat is formed in the vicinity of the mount 25. FIG. 10 shows an example of the holes 27 formed between the reels 36 and the mount 25. The holes 27 may be alternatively be included in aspects of invention shown in FIGS. 2 and 6.

FIG. 10 shows a tilting movement optical pickup actuator of FIG. 2 further including the holes 27. The holes 27 may also be applied to the tilting movement optical pickup actuator of FIG. 6.

The holes 27 may be open to a surface or enclosed, and sized so that a required strength of the bobbin 20 and/or 120 is retained.

In the aspects of the invention described with reference to FIGS. 2, 4, 6, 8, and 10, the tilting movement optical pickup actuator further includes a pair of outer yokes 15 positioned on the base 11. The unipolar magnets 31 are positioned by the inside surfaces of the outer yokes 15.

While it has been described that the tilting movement optical pickup actuator according to an aspect of the present invention has the tracking coils 35 or 135 and the tilting coils 37 directly wound around the bobbin 20 or 120, aspects of the present invention are not limited to this description. For example, the tilting movement optical pickup actuator according to an aspect of the present invention has a structure in which one of the tracking coils 35 or 135 and one of the tilting coils 37 is directly wound around the bobbin 20 or 120 and the other one of the tracking coils 35 or 135 and the other one of the tilting coils 37 is bulk-type coils separately attached to the bobbin 20 or 120.

The tilting movement optical pickup actuator according to an aspect of the present invention is a two-sided magnetic circuit, since the tilting movement optical pickup actuator uses only two of the four sides of the bobbin 20 or 120 to generate a magnetic circuit. In contrast, a conventional optical pickup actuator of FIG. 1 requires all four sides of the bobbin 2 to generate the magnetic circuit.

Figure 11:
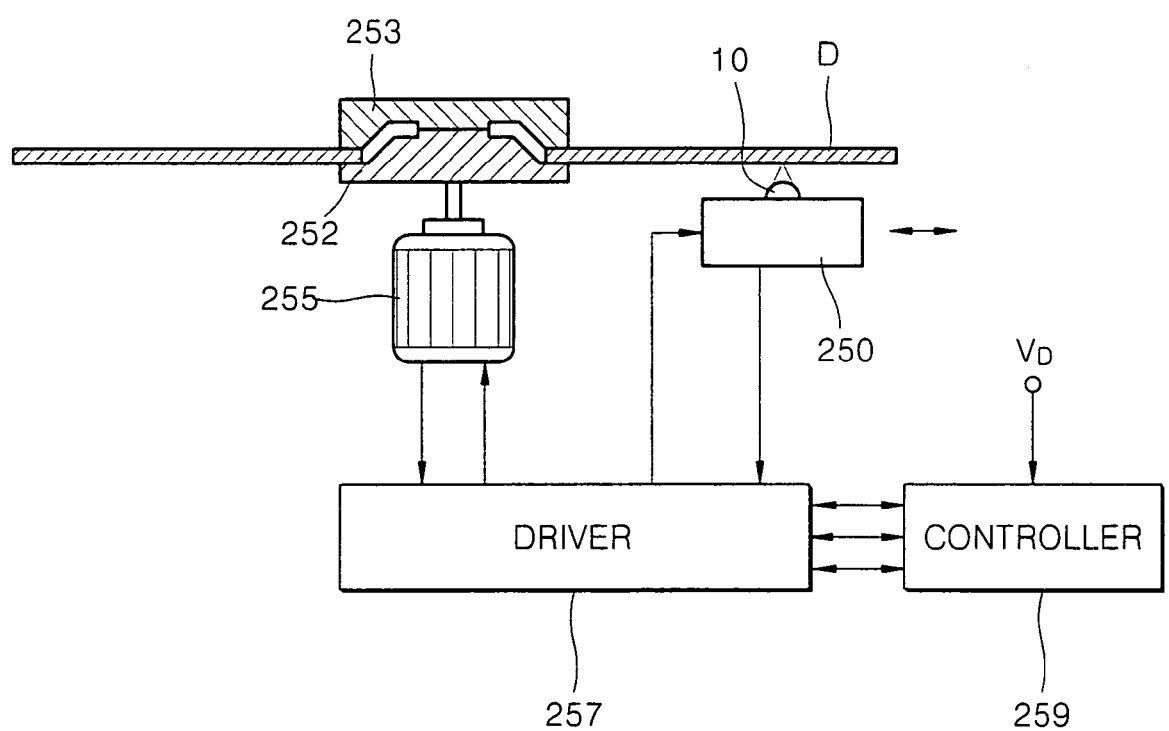
FIG. 11 is a schematic view showing the structure of an optical recording and/or reproducing apparatus using a tilting movement optical pickup actuator according to an aspect of the present invention.

FIG. 11 is a schematic view showing the structure of an optical recording and/or reproducing apparatus using a tilting movement optical pickup actuator according to an aspect of the present invention. Referring to FIG. 11, the optical recording and/or reproducing apparatus includes a spindle motor 255 to rotate an optical information storage medium, for example, an optical disc D. An optical pickup 250 moves in a radial direction of the optical disc D to record information on and/or to reproduce information from the optical disc D. The optical recording and/or reproducing apparatus also includes a driver 257 to drive the spindle motor 255 and the optical pickup 250, and a controller 259 to control a focusing servo, a tracking servo and/or a tilting servo. The apparatus also includes a turntable 252, and a clamp 253 to chuck the optical disc D.

The optical pickup 250 includes optical pickup optics with an objective lens 10 to condense light emitted from a light source onto the optical disc D and an optical pickup actuator to move the objective lens 10 in triaxial directions.

Light reflected from the optical disc D is detected by a photo-detector of the optical pickup 250 and converted into an electric signal. The electric signal is input to the controller 259 via the driver 257. The driver 257 controls the rotation speed of the spindle motor 255, amplifies the input electric signal, and drives the optical pickup 250. The controller 259 transmits focusing, tracking, and tilting servo commands controlled by the electric signal input via the driver 257 to the driver 257 for focusing, tracking, and tilting servo operations of the optical pickup 250.

As described above, a tilting movement optical pickup actuator according to an aspect of the present invention uses unipolar magnets, achieves various winding arrangements using a bobbin with winding guides, and performs triaxial movements even though having only two unipolar magnets. Thus, the tilting movement optical pickup actuator has reduced manufacturing costs, and alternatively is reduced in thickness. manufacturing costs are reduced by using two inexpensive unipolar magnets for the magnetic circuit.

Also, a portion of coils are directly wound around the bobbin to reduce dispersity due to varied production. As a result, the probability that the tilting movement optical pickup actuator includes production defects is reduced.

Moreover, the tilting movement optical pickup actuator according an aspect of the present invention increases linearity. When multiple polarizations are adopted on the same plane, the linearity is lowered. The sum of Lorentz forces that depend on magnetic flux density within a transient period varies as the tilting movement optical pickup actuator is positioned closer to a neutral zone located between polarizations and having a magnetic flux density of 0. However, since the tilting movement optical pickup actuator according to an aspect of the present invention uses unipolar magnets, linearity is increased.

Furthermore, in the tilting movement optical pickup actuator according to an aspect of the present invention, gaps between a mount of the bobbin in which an objective lens is held and reels are formed and/or at least one hole to inhibit the transmission of heat is formed in the bobbin. As a result, the objective lens is protected from an excessive current.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup actuator for use with an objective lens on a base, comprising:
    a bobbin holding the objective lens;
    a suspension having one end fixed on a side of the bobbin and another end fixed to a holder positioned on a portion of the base to allow the bobbin to be movable with respect to the base;
    a magnetic circuit, comprising:
        a pair of unipolar magnets positioned on the base to face opposing sides of the bobbin,
        a focusing coil wound around the bobbin,
        a pair of tracking coils wound opposite one another and next to the objective lens in a radial direction to cross over the focusing coil and the bobbin to interact with the unipolar magnets to generate an electromagnetic force to control a tracking movement, and
        a plurality of tilting coils positioned in an upper portion of the bobbin and/or in a lower portion of the bobbin and which interact with the unipolar magnets to generate an electromagnetic force to control a tilting movement when a central axis of the objective lens is disposed in an upward direction and a downward direction, the upward direction closer to an optical recording medium; and
    a pair of reels formed on the bobbin to directly wind the tracking coils and/or the tilting coils, and the tracking coils and/or the tilting coils are directly wound around the reels on the bobbin.

2. The optical pickup actuator of claim 1, wherein the pair of the reels comprising a pair of first reels formed opposite one another and next to the objective lens in the radial direction on the upper portion of the bobbin to wind the tracking coils and the tilting coils, and the tilting coils are wound around the pair of the first reels.

3. The optical pickup actuator of claim 2, wherein the pair of the reels further comprising a pair of second reels formed opposite one another and next to the objective lens in the radial direction on the lower portion of the bobbin to wind the tracking coils and the tilting coils, and the tilting coils are further wound around the pair of the second reels on the lower portion of the bobbin.

4. The optical pickup actuator of claim 1, further comprising a mount spaced apart from the pair of reels formed on the bobbin to hold the objective lens so as to reduce an effect of heat on the objective lens.

5. The optical pickup actuator of claim 4, wherein the tracking coils and the focusing coil are installed on the bobbin so that effective coil portions of the tracking coils are positioned closer to the unipolar magnets than effective coil portions of the focusing coil.

6. The optical pickup actuator of claim 4, further comprising a cavity formed in the bobbin to reduce a transmission of heat generated from the focusing coil, the tracking coils, and/or the tilting coils to the objective lens.

7. The optical pickup actuator of claim 1, wherein the tracking coils and the focusing coil are positioned on the bobbin so that effective coil portions of the tracking coils are closer to the unipolar magnets than effective coil portions of the focusing coil.

8. The optical pickup actuator of claim 1, further comprising a cavity formed in the bobbin to reduce transmission of heat generated from the focusing coil, the tracking coils, and/or the tilting coils to the objective lens.

9. The optical pickup actuator according to claim 1, wherein the magnetic circuit includes only a single pair of unipolar magnets.

10. The optical pickup actuator according to claim 1, wherein the actuator is a two-sided, three axis driving actuator.

* * * * *